Patented Feb. 20, 1940

2,190,836

UNITED STATES PATENT OFFICE 2,190,836

TREATMENT OF OLEFIN-SULPHUR DIOXIDE RESINS

Jesse Harmon, Wilmington, Del., assignor to E. I. du Pont de Nemours and Company, Wilmington, Del., a corporation of Delaware No Drawing. Application October 18, 1938,
Serial No. 235,561

9 Claims. (Cl. 260—94)

This invention relates to the treatment of olefin-sulphur dioxide resins and, more particularly, to the production of olefin-sulphur dioxide resins of improved stability adapted to give transparent moldings.

Heretofore, olefin-sulphur dioxide resins have been prepared by the reaction of olefins with sulphur dioxide in the presence of various catalysts and under various conditions. The term "olefin" is used here in its commonly accepted meaning to denote mono-olefins. With only rare exceptions, these olefin-sulphur dioxide resins are polymeric products in which the olefin and the sulphur dioxide have combined in equimolecular parts although the extent of the combination, i. e., the size of the macromolecule may vary. These resins have properties which make them especially valuable in the field of plastics in different molding processes, although they are also adapted for use in other fields as liquid coating compositions and the like.

The crude resins as heretofore prepared have certain disadvantages generally attributed to their lack of stability. They tend to give opaque moldings, a fatal objection to their use for many purposes, and show various signs of instability such as deteriorating on aging, and the like, which are objectionable no matter how these resins are used.

The purpose of the present invention is to provide a simple and practical means of treating the crude olefin-sulphur dioxide resins to give a product of improved stability. A further and particular object is to provide a means of treating these resins so as to obtain an improved resin which will give transparent moldings. Other objects will be apparent from the description of the invention given hereinafter.

The above objects are accomplished according to the present invention by digesting the crude olefin-sulphur dioxide resin in finely divided form for a prolonged period in a digesting liquor adapted to penetrate the particles of the resin but not to agglomerate them at the temperature employed.

By the term "penetrate" as used herein is meant that the digesting liquor shall actually enter into or permeate the resin particles, that is, be dissolved by the resin to some extent. As a practical example, the digesting liquor normally used will be one which just fails to cause agglomeration of the resin particles under the particular conditions of use.

While, in isolated instances, the digesting liquor may be a single organic liquid which will penetrate the resin particles at temperatures convenient to employ but will not cause the particles to agglomerate, it has been found more convenient, particularly with respect to adjusting the digesting liquor to the required penetrating power for specific resins, to employ a two-component digesting liquor. The two-component digesting liquor has, as one component, an organic liquid which alone either dissolves the resin or has a powerful swelling action thereon that would coalesce the resin particles and, as the other component, a liquid which alone does not dissolve the resin and has no more than a slight swelling action on the resin if, indeed, it has any such action at all. By the term "slight swelling action" as used herein is meant that this component of the digesting liquor does not cause the resin particles to coalesce, that is, to agglomerate or mat together.

The proportion of the components in the digesting liquor will, of course, be determined by the penetrating power required for the particular resin to be treated. The greater the penetrating action, the more efficient the present digesting treatment is but great care must be taken to avoid using a digesting liquor having a solvent action on the resin great enough to cause the particles of resin to soften and agglomerate. In making up a two-component digesting liquor to be used, for example, with a butene-sulphur dioxide resin, an organic liquid such as benzene, beta-methoxyethanol, or methanol may be used together with an organic liquid having a solvent or more powerful swelling and penetrating action on the resin. In such instances, the benzene or the like has, in itself, almost sufficient penetrating and swelling action and, in fact, may be used with some degree of success alone. Therefore, it is apparent that the amount of organic liquid which has a solvent or powerful swelling action on the resin, will be used in relatively minor proportions. For example, with a butene-sulphur dioxide resin, a mixture of benzene with either acetone or dioxan, both having a solvent action on these resins, gives a most desirable digesting liquor with the use of approximately 90% benzene and 10% acetone or dioxan. On the other hand, where one component of the digesting liquor is a liquid such as diethyl ether or petroleum ether (benzine) which have no appreciable swelling action on the butene-sulphur dioxide resin, a considerably higher proportion of an active solvent liquid would be employed.

The temperature at which the digestion is carried out will, to some extent, affect the penetrating power of the digesting liquor so, when the digesting liquor is being made up, some consideration must be given to the temperature that is to be used. Usually, a temperature within the range of 20–35° C. would be employed and, within that range, the action of the digesting liquor on the resin does not ordinarily change appreciably.

In carrying out the process of the present invention, the resin to be digested should, for economical operation, be finely divided so as to pass a 30-mesh screen, preferably fine enough to pass an 80-mesh screen; the temperature of digestion should be between 5–60° C., preferably about 20–35° C., and, in any instance, not above the boiling point of either component of the digesting liquor unless the digestion is to be carried out under pressure in a closed vessel; the digestion should be continued for at least 24 hours and, preferably, for several days; and the mixture should be thoroughly agitated at least intermittently. The digesting liquor must be used in sufficient amount to wet the resin thoroughly and give a flowable mixture.

It has been found that the above conditions, although not absolute or critical, should be observed for the most practical operation of the present invention. The period of digestion will vary dependent especially upon the degree of subdivision of the resin and the temperature employed. The more finely divided the resin and the higher the temperature, the shorter is the period of digestion necessary, but it is always a relatively prolonged period of 24 hours or more.

One of the salient features of the present invention is the composition of the digesting liquor employed. It has been discovered that the use, under the conditions herein described, of a digesting liquor which will penetrate the resin particles but will not agglomerate them at the digestion temperature, effects quite unexpectedly a very significant stabilization of these olefin-sulphur dioxide resins. The resins so treated give transparent moldings and show substantially no tendency toward deterioration on aging or other indications of instability encountered to a greater or lesser degree in the crude resins. Further, while the particular composition of the digesting liquor may have to be varied somewhat because of the different solubilities of different olefin-sulphur dioxide resins, it has been found that this improved stability may be effected in any of the crude resins of this class by the present procedure; that is, the fundamental discovery of using a digesting liquor which will penetrate but not soften to the point of agglomeration the resin particles to be treated, is applicable to olefin-sulphur dioxide resins generally even though any specific digesting liquor may not be generally applicable to all olefin-sulphur dioxide resins because of divergent solubility characteristics of particular resins.

To illustrate the invention specifically, the results obtained using various digesting liquors are given hereinafter with respect to n-butylene polysulphone resin. The preparation of the resin and the digestion thereof were carried out as follows:

A glass-lined pressure vessel was charged with a mixture of 670 grams of n-butylene (mixed 1- and 2-butenes), 2036 grams of sulphur dioxide, 100 grams of absolute ethanol, and 6.7 grams of benzoyl peroxide, and allowed to stand at 20–30° C. for 4 days during which time the mixture became extremely viscous. The reaction mass was forced, in small portions, into boiling water which expelled most of the free sulphur dioxide and left the resin as white, hard, porous lumps. After being thoroughly dried at 45–50° C., the resin weighed 1410 grams. It was ground in a hammer mill to pass through an 80-mesh screen. A control sample, when compression molded at 160° C., gave an opaque article which was light gray in color.

In carrying out the digestion tests 20 grams of the 80-mesh resin and 200 cc. of the digesting liquor were mechanically agitated in a closed container at 20–30° C. for 9–11 days. The mixture was then filtered and the precipitate was washed with a fresh quantity of the digesting liquor and then with water in those instances where an aqueous solution of an inorganic compound formed one component of the digesting liquor. The precipitate was dried at room temperature for at least a day and then at 45–55° C. for a minimum of a day until the resin was essentially free from the digesting liquor and/or wash liquids. Seven grams of each treated resin were molded in 2" cylindrical molds at 160° C. and 3000 pounds per sq. in. pressure using a seven minute heating cycle.

DIGESTION OF N-BUTYLENE POLYSULPHONE RESIN

*Group A—Preferred digesting liquors (percentages by volume)*

| | Per cent |
|---|---|
| Example I: | |
|    Methylene chloride | 30 |
|    Methanol | 70 |
| Example II: | |
|    Methyl acetate | 30 |
|    Methanol | 70 |
| Example III: | |
|    Acetone | 20 |
|    Methanol | 80 |
| Example IV: | |
|    Ethyl acetate | 50 |
|    Methanol | 50 |
| Example V: | |
|    Ethylene glycol dimethyl ether | 50 |
|    Methanol | 50 |
| Example VI: | |
|    Acetone | 30 |
|    Absolute ethanol | 70 |
| Example VII: | |
|    Dioxan | 15 |
|    Methanol | 85 |
| Example VIII: | |
|    Acetone | 30 |
|    Benzin | 70 |
| Example IX: | |
|    Acetone | 10 |
|    Benzene | 90 |
| Example X: | |
|    Dioxan | 10 |
|    Benzene | 90 |
| Example XI: | |
|    Benzene | 100 |
| Example XII: | |
|    Beta-methoxyethanol | 100 |

*Group B—Other operable digesting mixtures*
*(percentages by volume)*

Example XIII: Per cent
  Acetone _____ 30
  Ether _____ 70
Example XIV:
  Acetone _____ 30
  Ethylene glycol _____ 70
Example XV:
  Chloroform _____ 50
  Ether _____ 50
Example XVI:
  Methyl acetate _____ 10
  Benzene _____ 90
Example XVII:
  Chloroform _____ 30
  Benzene _____ 70
Example XVIII:
  Acetone _____ 40
  0.1 molar aqueous sodium bicarbonate __ 60
Example XIX:
  Acetone _____ 40
  0.1 molar aqueous sodium hydroxide ____ 60
Example XX:
  Acetone _____ 40
  Aqueous $NaH_2PO_4$ of pH 7.48 _____ 60
Example XXI:
  Dioxan _____ 20
  Benzine _____ 80
Example XXII:
  Chloroform _____ 30
  Methanol _____ 70
Example XXIII:
  Chloroform _____ 50
  Benzine _____ 50
Example XXIV:
  Dioxan _____ 30
  Benzene _____ 70
Example XXV:
  Dioxan _____ 40
  Ether _____ 60
Example XXVI:
  Methanol _____ 100
Example XXVII:
  Methanol (hot) _____ 100

In each instance the digesting liquors in preferred Group A above penetrated the resin particles but did not cause them to agglomerate and the articles molded from the digested resins were transparent.

The digesting liquors in Group B were not as uniform in their action on the resin, particularly Examples XXIV and XXV, softened the resin to such an extent that the particles of resin showed a slight tendency to agglomerate. The articles molded from the digested resins in this Group B were not completely transparent, exhibiting various degrees of cloudiness but always were of appreciably less cloudiness than the control sample and in no case completely opaque.

In the above examples where two-component digesting liquors are disclosed, the first component given is the organic liquid which alone either dissolves or has a powerful swelling action on the resin while the second component is the liquid which alone has no solvent action and no more than a slight swelling action on the resin.

*Example XXVIII.*—Mixed propylene-n-butylene polysulphone: A glass pressure vessel was cooled to —80° C. and charged with 10.5 grams of propylene, 2.8 grams of n-butylene (mixed 1- and 2-butenes), 24 grams of sulphur dioxide, 50 grams of absolute ethanol, 0.1 gram of ascaridole and 0.1 gram of benzoyl peroxide. The vessel was then closed and allowed to stand at room temperature for 5 days. The resulting polymer was filtered, washed with ether, ground and dried. It amounted to 25.2 grams and a test sample gave an opaque article when compression molded at 165° C. and 3000 lbs. per sq. in. Seventeen grams of the resin were then treated as described heretofore in connection with the digestion tests with 200 cc. of an 80% methanol-20% acetone mixture. A test sample of the purified resin was compression molded as previously described to a clear article.

*Example XXIX.*—1-butene polysulphone: A mixture of 36 grams of 1-butene, 100 grams sulphur dioxide, 10 grams absolute ethanol, and 0.32 gram benzoyl peroxide was allowed to stand at 25–30° C. in a closed glass vessel for 3 days. A colorless, highly viscous solution of resin in sulphur dioxide resulted. The volatile constituents of the resin solution were allowed to escape, the resin was dissolved in chloroform, precipitated in ether, dried and ground. It weighed 49 grams. A test sample gave a translucent article when it was compression molded at 160° C. and 2000 lbs. per sq. in. for 5 minutes. The main portion of the resin was extracted with 200 cc. of an 80% methanol-20% acetone mixture at 25–30° C. for 17 hours, filtered and dried at 40° C. A test sample of the purified resin then gave a transparent, colorless, tough article when compression molded as described above.

*Example XXX.*—2-butene polysulphone: A mixture of 50 grams of 2-butene, 225 grams of sulphur dioxide and 10 grams of absolute ethanol were charged into a pressure flask and allowed to stand at 25–30° C. for 5 days at which time the mixture was quite viscous. The volatile constituents were allowed to escape, the resin was dissolved in 300 grams of chloroform, then precipitated with 500 grams of ether, dried, and ground to pass an 80-mesh screen. The yield of resin was 31 grams. A test sample gave an opaque article when compression molded at 160° C. and 3000 pounds per sq. in. Twenty grams of this resin were then extracted with 200 cc. of an 80% methanol-20% acetone mixture at 25–30° C. for 6 days. The purified resin gave a clear, colorless, hard article when compression molded as described above.

It will be understood that the above examples are merely illustrative both as to the specific olefin-sulphur dioxide resins to which the invention is applicable and to the particular digesting liquors selected for digesting the resin. Those skilled in the art will understand that the invention is broadly applicable to this general class of resins and that the components of the digesting liquor, as well as the proportions thereof, may be varied widely so long as the digesting liquor is adapted to penetrate the particles of resin but will not agglomerate them at the temperature employed.

Ordinarily, a digesting liquor will be employed that will result in a treated resin adapted to give a transparent molding but, where a transparent molding is not to be made, stabilization may also be accomplished advantageously through the use of digesting liquors that may result in a treated resin which gives more or less cloudy moldings.

While reference has been made to "two-component" digesting liquors, the invention obviously contemplates the use of two or more organic liquids which alone have a solvent or, at least, a powerful swelling action on the resin and/or two or more liquids which alone have no solvent action and no more than a slight swelling action on the resin.

The specific examples illustrate the application of the invention to the digestion of resins made by the reaction of sulphur dioxide and butenes or mixtures of butenes with propylene. The resins obtained by reacting sulphur dioxide with other olefins such as pentene-2, 3-cyclohexylpropene-1, 2-methylpropene, pentene-1, nonene-1, cyclohexene, ethylene, propylene, 3-methylcyclohexene, octene-2, allyl alcohol, undecylenyl alcohol, octene-1, and allyl ethyl ether, may be similarly treated in accordance with the present invention to give resins of improved stability and appearance.

While the preferred conditions of time, temperature, physical state of the resin to be treated, and the like, have been given above, it will be understood that these conditions may be modified and, in commercial operation, a few simple preliminary tests would ordinarily be made to establish the best conditions for treating any particular resin. In general, a fine state of division of the resin and a relatively high temperature which, nevertheless, should be well below the boiling point of the components of the digesting liquid, is favored, as the period of digestion to achieve a resin of the desired stability may be shortened.

An advantage of the present invention is that it provides an economically feasible means of producing olefin-sulphur dioxide resins adapted to give transparent moldings, thereby enormously widening the field of use to which this type of resin is applicable. A further and important advantage is that the treated resins are of improved stability and do not tend to deteriorate on aging.

As many apparently widely different embodiments of this invention may be made without departing from the spirit and scope thereof, it is to be understood that the invention is not limited to the specific embodiments thereof except as defined in the appended claims.

I claim:

1. Process of treating a crude olefin-sulphur dioxide resin which comprises digesting said resin in finely divided form for a prolonged period in a digesting liquor comprising an organic liquid which alone has a solvent or, at least, a powerful swelling action on the resin, and a second liquid which alone has no solvent action and no more than a slight swelling action on said resin, the components of said digesting liquor being so apportioned that said digesting liquor is adapted to penetrate the particles of said resin but not agglomerate same at the temperature employed.

2. Process of treating a crude olefin-sulphur dioxide resin which comprises digesting said resin in finely divided form for a period of at least 24 hours at a temperature of 5-60° C. in a digesting liquor comprising an organic liquid which alone has a solvent or, at least a powerful swelling action on the resin, and a second liquid which alone has no solvent action and no more than a slight swelling action on said resin, the components of said digesting liquor being so apportioned that said digesting liquor is adapted to penetrate the particles of said resin but not agglomerate same at the temperature employed, the amount of said digesting liquor being sufficient to wet said resin and give a flowable mixture, said mixture being thoroughly agitated at least intermittently throughout the digesting period.

3. Process of treating a crude olefin-sulphur dioxide resin which comprises digesting said resin in finely divided form such that it will pass through a 30-mesh screen, for a period of at least 24 hours at a temperature of 20-35° C. in a digesting liquor comprising an organic liquid which alone has a solvent or, at least, a powerful swelling action on the resin, and a second liquid which alone has no solvent action and no more than a slight swelling action on said resin, the components of said digesting liquor being so apportioned that said digesting liquor is adapted to penetrate the particles of said resin but not agglomerate same at the temperature employed, the amount of said digesting liquor being sufficient to wet said resin and give a flowable mixture, said mixture being thoroughly agitated at least intermittently throughout the digesting period.

4. Process of treating a crude olefin-sulphur dioxide resin obtained by reacting sulphur dioxide with a butene, which comprises digesting said resin in finely divided form for a period of at least 24 hours at a temperature of 5-60° C. in a digesting liquor comprising an organic liquid alone has a solvent or, at least, a powerful swelling action on the resin, and a second liquid which alone has no solvent action and no more than a slight swelling action on said resin, the components of said digesting liquor being so apportioned that said digesting liquor is adapted to penetrate the particles of said resin but not agglomerate same at the temperature employed, the amount of said digesting liquor being sufficient to wet said resin and give a flowable mixture, said mixture being thoroughly agitated at least intermittently throughout the digesting period.

5. Process of treating a crude olefin-sulphur dioxide resin obtained by reacting sulphur dioxide with a mixture of 1- and 2-butenes, which comprises digesting said resin in finely divided form for a period of at least 24 hours at a temperature of 5-60° C. in a digesting liquor comprising an organic liquid which alone has a solvent or, at least, a powerful swelling action on the resin, and a second liquid which alone has no solvent action and no more than a slight swelling action on said resin, the components of said digesting liquor being so apportioned that said digesting liquor is adapted to penetrate the particles of said resin but not agglomerate same at the temperature employed, the amount of said digesting liquor being sufficient to wet said resin and give a flowable mixture, said mixture being thoroughly agitated at least intermittently throughout the digesting period.

6. Process of treating a crude olefin-sulphur dioxide resin obtained by reacting sulphur dioxide with a butene, which comprises digesting said resin in finely divided form for a prolonged period at a temperature of 5-60° C. in a digesting liquor comprising methanol and a liquid from the group consisting of methylene chloride, methyl acetate, ethyl acetate, ethylene glycol dimethyl ether, acetone, and dioxan, the components of said digesting liquor being so apportioned that said digesting liquor is adapted to penetrate the particles of said resin but not agglomerate same at the temperature employed, and the amount of said digesting liquor being sufficient to wet said resin and give a flowable mixture, said mixture being thoroughly agitated at least intermittently throughout the digesting period.

7. Process as recited in claim 6 wherein the digesting liquor comprises methanol and methylene chloride.

8. Process as recited in claim 6 wherein the digesting liquor comprises methanol and methyl acetate.

9. Process as recited in claim 6 wherein the digesting liquor comprises methanol and acetone.

JESSE HARMON.

CERTIFICATE OF CORRECTION.

Patent No. 2,190,836. February 20, 1940.

JESSE HARMON.

It is hereby certified that error appears in the printed specification of the above numbered patent requiring correction as follows: Page 4, second column, line 31, before the word "alone" insert which; and that the said Letters Patent should be read with this correction therein that the same may conform to the record of the case in the Patent Office.

Signed and sealed this 9th day of April, A. D. 1940.

Henry Van Arsdale,
Acting Commissioner of Patents.

(Seal)